UNITED STATES PATENT OFFICE.

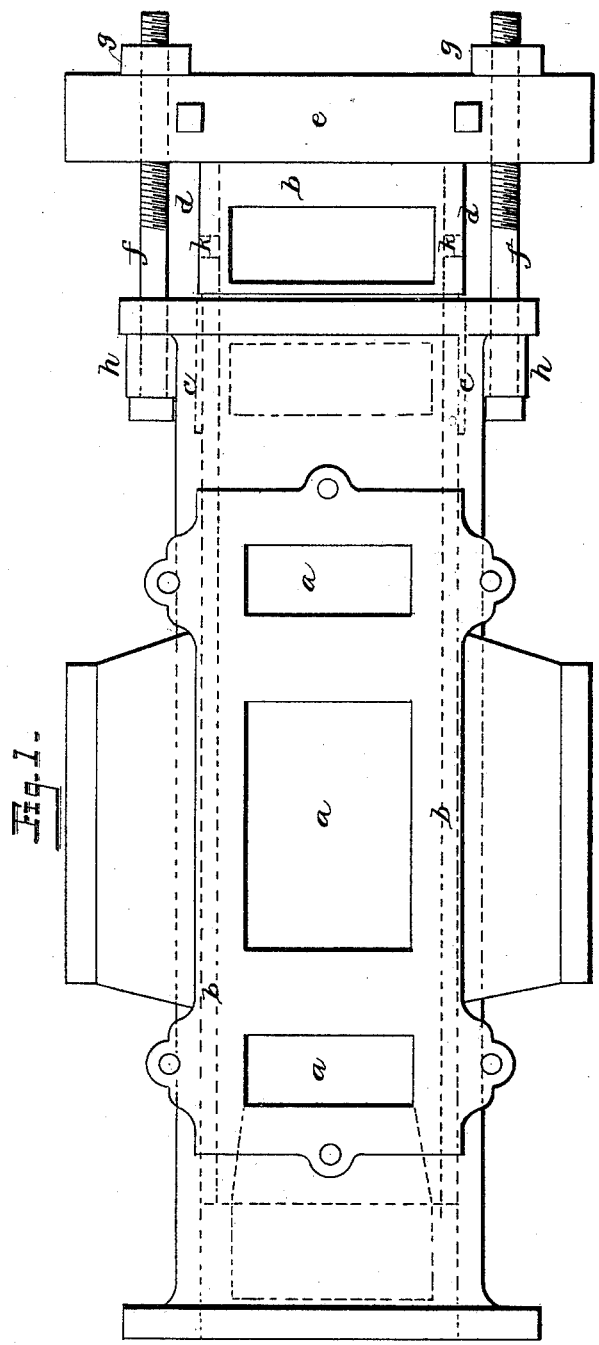

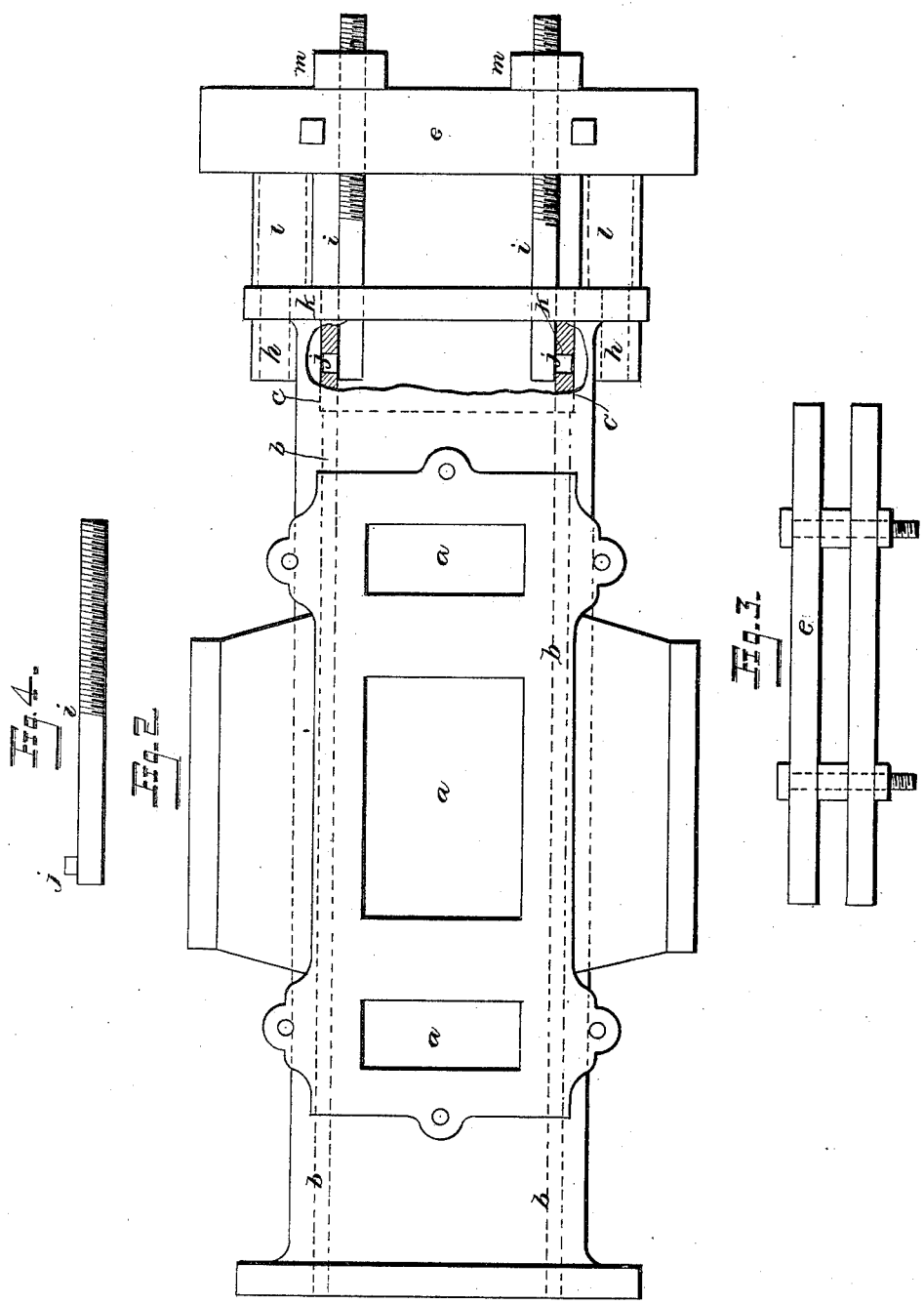

DAVID EVANS, OF CONNELLSVILLE, PENNSYLVANIA, ASSIGNOR TO THE BOYTS, PORTER & COMPANY, OF SAME PLACE.

DEVICE FOR DRIVING IN AND WITHDRAWING CYLINDER-LININGS.

SPECIFICATION forming part of Letters Patent No. 442,312, dated December 9, 1890.

Application filed August 4, 1890. Serial No. 360,858. (No model.)

*To all whom it may concern:*

Be it known that I, DAVID EVANS, a citizen of the United States, residing at Connellsville, Fayette county, in the State of Pennsylvania, have invented a new and useful Improvement in Driving and Withdrawing Devices for Cylinder-Linings, of which the following is a specification.

My invention consists of a device for driving in and withdrawing metallic linings from cylinders, and in which device provision is made for attaching it to the end of the cylinder for forcing in the lining, and also for connecting the device to the lining to effect the withdrawal of the latter under a pulling force exerted upon the cylinder. The construction and manner of applying the device render it easy and convenient to drive in and to set the lining so that openings therein will be made to coincide with the ports in the cylinder, and to easily pull out the lining for the purpose of renewing it when worn so as to render it unfit for longer use. In mining-pumps, where the acids and sulphur in the water will in a comparatively short time cut and destroy the lining, the provision for quickly removing and renewing the lining is of special importance, because it saves the pump-cylinder from being destroyed by the action of the acids. To remove the lining the cylinder-heads are first removed and the pump-piston taken out.

In the drawings I have illustrated my invention as applied to the cylinder of a mining-pump, which in Figure 1 is shown in top view and the lining in the position it occupies in the operation of driving it within the cylinder and the driving device in operative relation to the cylinder and to the lining. Fig. 2 is a top view of the cylinder, showing my invention in operative relation to the same and to the lining for withdrawing the latter, the end of the cylinder being shown in broken-away section to expose the manner of fastening the withdrawing device to the lining; and Fig. 3 shows the abutment-beam, which is connected to the end of the cylinder, and to which the force is applied both in driving in and withdrawing the lining; and Fig. 4 is the drawing-bolt.

The drawings show the upper port side of the cylinder, wherein $a$ indicates the ports which communicate with the upper valve-chambered section, which is not shown. The lining $b$ is of the same length as the cylinder, and is cast with openings which correspond with the ports in the cylinder. One end of the cylinder is bored out at $c$, so as to increase the interior diameter for a certain distance, and for a corresponding distance the lining is made thicker at $d$, so as to fit tightly within this increased bore and permit the lining to be slipped in freely up to this thicker part and then driven in to bind it tight in place.

In Fig. 1 the lining is shown as having been inserted loosely within the cylinder up to the binding part, and it is at this time that the driving device is applied to complete the insertion of the lining at its tightly-fitting end.

The driving device consists of an abutment-beam $e$, preferably made of two beams bolted flatwise together with a space between them and having a length greater than the diameter of the lining, two drive-bolts $ff$, placed in diametric openings in the cylinder-flange, with their screw-threaded ends passed between the abutment-beams, and the nuts $g\ g$ upon the bolts, so that the abutment-beam having been placed edgewise across and against the end of the lining and the nuts driven up by wrenches forces the beam inward hard upon the lining, and thus drives it home. To resist the strain upon the flange of the cylinder, two bosses $h$ are cast thereon back of the flange coincident with the diametric openings to receive the bolts and upon which the bolt-heads rest.

The provision for withdrawing the lining is shown in Fig. 2, and consists of two hook draw-bolts $i\ i$, each having a projection $j$ on the side at its non-threaded end adapted to fit or hook into holes $k$, formed diametrically in the thickened end of the lining, to lock the bolts therewith, and of two posts $l$, having a length greater than the length of the thickened end of the lining, for supporting the abutment-beam against the end of the cylinder, so that the draw-bolts passing through the said beams and having the nuts $m$ thereon turned by wrenches against the beam will draw the bolts and the lining out from the cylinder until the binding end of the lining is free. In this operation the drive-bolts may be put in place through the posts, which may be hollow, to clamp and hold the abutment-beam and posts against the cylinder end; but the clamping action of the draw-bolts will hold these parts in position without the other bolts.

The thickened end of the lining, while serving to form the binding part within the cylinder, serves also to give the required strength to the end of the lining to resist the great force of the draw-bolts, because under such force the end of the lining, if not made thick, would be liable to pull out at the holes.

In applying the device as a driver the abutment-beam acts as a follower to force the lining into the cylinder, and in applying the device to withdraw the lining the abutment-beam acts in a fixed relation to the cylinder, and in both cases the action of the device gives a uniform force and movement to the lining. The driving action of the device also gives the advantage of preserving the alignment of the openings in the lining with the ports in the cylinder, and thus avoid the expense and trouble of having to cut the port-openings in the lining after the latter has been driven into the cylinder, as is the present practice in using linings in mining-pumps.

I claim—

1. A device for withdrawing linings from cylinders, consisting of an abutment-beam, two screw-bolts, each having an arm on its side at its non-threaded end, adapted to be hooked into an opening formed diametrically in said lining, nuts upon said bolts against the outer side of said abutment-beam, and posts supporting said abutment-beam upon the end of said cylinder, substantially as set forth.

2. A device for driving linings into cylinders, consisting of an abutment-beam, two screw-bolts in the cylinder-flange passing through said beam, and nuts upon said bolts against the outer side of said beam, substantially as set forth.

3. A device for driving in and for drawing linings from cylinders, consisting of an abutment-beam, screw-bolts and nuts for connecting it to the cylinder, draw-bolts and nuts for connecting said abutment-beam to the lining, and posts for supporting said abutment-beam against the end of the cylinder, substantially as set forth.

In testimony whereof I have hereunto set my hand in the presence of two subscribing witnesses.

DAVID EVANS.

Witnesses:
C. D. SCHELL,
B. E. WITHERS,